US008654531B2

(12) United States Patent
Chen et al.

(10) Patent No.: US 8,654,531 B2
(45) Date of Patent: Feb. 18, 2014

(54) ELECTRONIC DEVICE

(75) Inventors: Ming-Chih Chen, New Taipei (TW);
Chen-Hsien Chuang, New Taipei (TW);
Wei-Cheng Chou, New Taipei (TW)

(73) Assignee: Wistron Corporation, New Taipei (TW)

( * ) Notice: Subject to any disclaimer, the term of this patent is extended or adjusted under 35 U.S.C. 154(b) by 226 days.

(21) Appl. No.: 13/155,351

(22) Filed: Jun. 7, 2011

(65) Prior Publication Data

US 2012/0155023 A1  Jun. 21, 2012

(30) Foreign Application Priority Data

Dec. 21, 2010  (TW) ................................ 99224714 U

(51) Int. Cl.
 *H05K 7/20* (2006.01)
(52) U.S. Cl.
 USPC ............................ 361/700; 361/694; 361/695
(58) Field of Classification Search
 USPC ........................................................ 361/694
 See application file for complete search history.

(56) References Cited

U.S. PATENT DOCUMENTS

| 5,566,377 | A  | * | 10/1996 | Lee ................................ 361/695 |
| 6,280,318 | B1 | * | 8/2001  | Criss-Puszkiewicz et al. .............................. 454/184 |
| 6,525,936 | B2 | * | 2/2003  | Beitelmal et al. ............. 361/695 |
| 6,778,390 | B2 | * | 8/2004  | Michael ......................... 361/695 |
| 7,361,081 | B2 | * | 4/2008  | Beitelmal et al. ............. 454/184 |
| 2006/0061966 | A1 | * | 3/2006 | Korinsky et al. .............. 361/695 |
| 2010/0048120 | A1 |   | 2/2010 | Chuang ......................... 454/184 |

* cited by examiner

*Primary Examiner* — Gregory Thompson
(74) *Attorney, Agent, or Firm* — Ladas & Parry, LLP

(57) ABSTRACT

An electronic device includes a housing unit, a first electronic component, a heat-dissipating module, and an air-guide passage. The first electronic component, the heat-dissipating module, and the air-guide passage are disposed in the housing unit. The heat-dissipating module includes a fan unit and a heat-dissipating sink. The fan unit has a first air outlet zone and a second air outlet zone. The heat-dissipating sink is for dissipating heat generated by the first electronic component. The heat-dissipating sink is substantially aligned with the first air outlet zone. The air-guide passage is in spatial communication with the second air outlet zone and is formed with a passage air outlet. Air through the first air outlet zone flows in a first direction. Air through the passage air outlet is directed into the housing unit and flows in a second direction different from the first direction.

9 Claims, 6 Drawing Sheets

ELECTRONIC DEVICE

CROSS-REFERENCE TO RELATED APPLICATION

This application claims priority of Taiwanese Patent Application No. 099224714 filed on Dec. 21, 2010, the disclosures of which is incorporated herein by reference.

BACKGROUND OF THE INVENTION

1. Field of the Invention

The present invention relates to an electronic device, more particularly to a heat-dissipating mechanism of an electronic device.

2. Description of the Related Art

In a conventional notebook computer such as that disclosed in U.S. Patent Application Publication No. 2010/0048120 A1, a fan is disposed in a computer housing of the notebook computer, and a heat-dissipating member and a heat-conducting pipe are provided for cooperation with the fan so as to perform heat dissipation. In general, the fan is further disposed adjacent to one of lateral edges and a rear edge of the computer housing.

Moreover, in the conventional notebook computer with the fan, a front edge of the computer housing is seldom provided with an air vent to prevent an adverse affect on appearance and to avoid user discomfort resulting from forwardly blowing air. Therefore, heat accumulation may occur in an area in the computer housing adjacent to the front edge (such as an area where a touch panel is disposed), since cold air current generated by the fan is unlikely to reach the area.

SUMMARY OF THE INVENTION

Therefore, an object of the present invention is to provide an electronic device in which a portion of air current generated by a fan may be guided to an area with insufficient heat dissipation so as to overcome the aforesaid drawbacks of the prior art.

Accordingly, an electronic device of the present invention includes a housing unit, a first electronic component, a heat-dissipating module, and an air-guide passage. The first electronic component is disposed in the housing unit. The heat-dissipating module includes a fan unit and a heat-dissipating sink. The fan unit is disposed in the housing unit and has a first air outlet zone and a second air outlet zone. The heat-dissipating sink is disposed in the housing unit for dissipating heat generated by the first electronic component. The heat-dissipating sink is substantially aligned with the first air outlet zone. The air-guide passage is disposed in the housing unit. The air-guide passage is in spatial communication with the second air outlet zone and is formed with a passage air outlet. Air through the first air outlet zone flows in a first direction. Air through the passage air outlet is directed into the housing unit and flows in a second direction different from the first direction.

An effect of the present invention is achieved by disposition of the fan unit, the heat-dissipating sink and the air-guide passage, such that a portion of air from the fan unit flows to the heat-dissipating sink and another portion of air from the fan unit is guided by the air-guide passage to flow to an area in the housing unit that may be hard for air from the fan unit to reach so as to reduce heat accumulation in the area with insufficient heat dissipation.

BRIEF DESCRIPTION OF THE DRAWINGS

Other features and advantages of the present invention will become apparent in the following detailed description of the three preferred embodiments with reference to the accompanying drawings, of which.

DETAILED DESCRIPTION OF THE PREFERRED EMBODIMENTS

Figure 1:
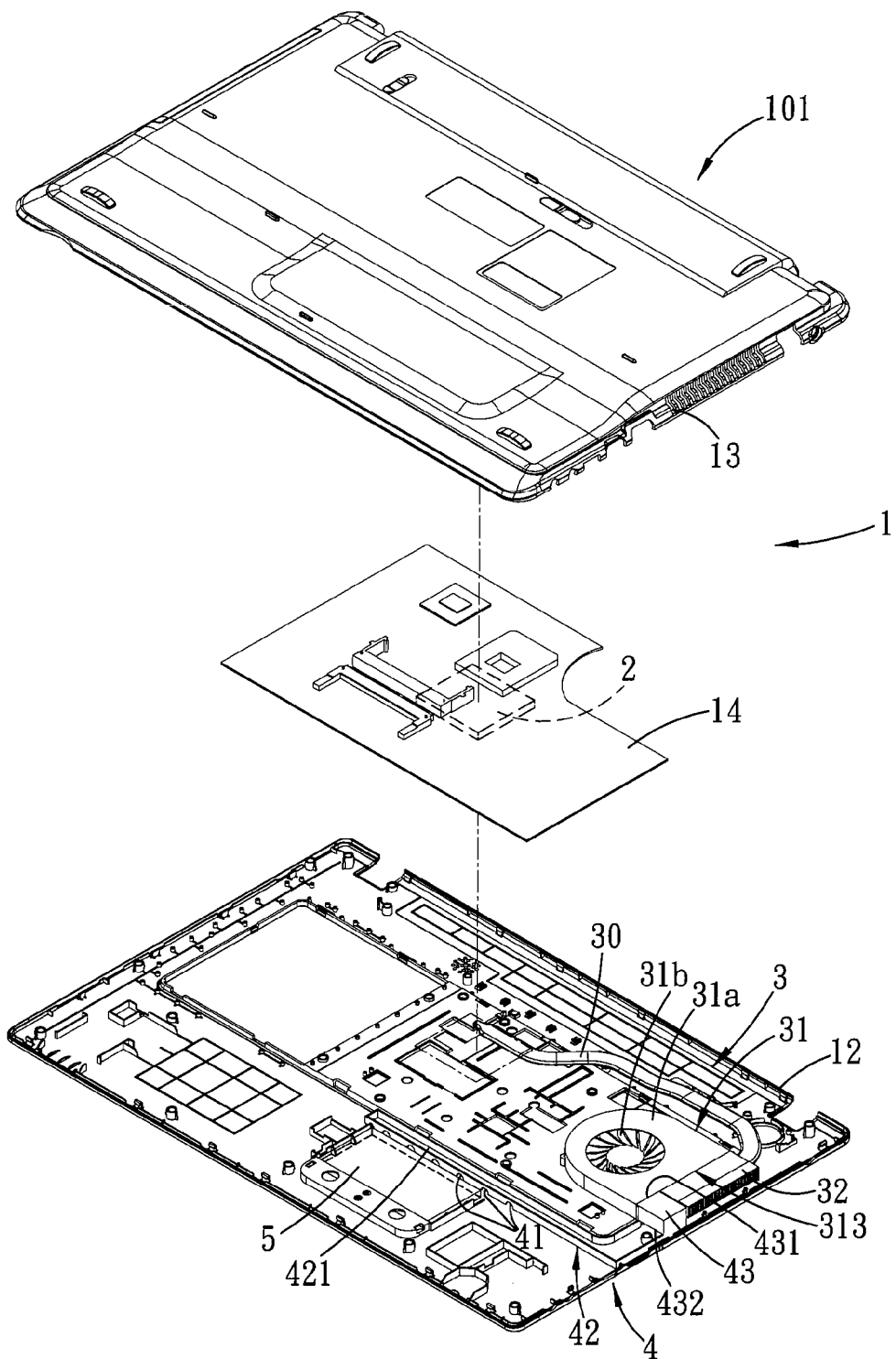
FIG. 1 is an exploded perspective view illustrating a first preferred embodiment of an electronic device of the present invention.

Before the present invention is described in greater detail with reference to the preferred embodiments, it should be noted that the same reference numerals are used to denote the same elements throughout the following description.

Figure 2:
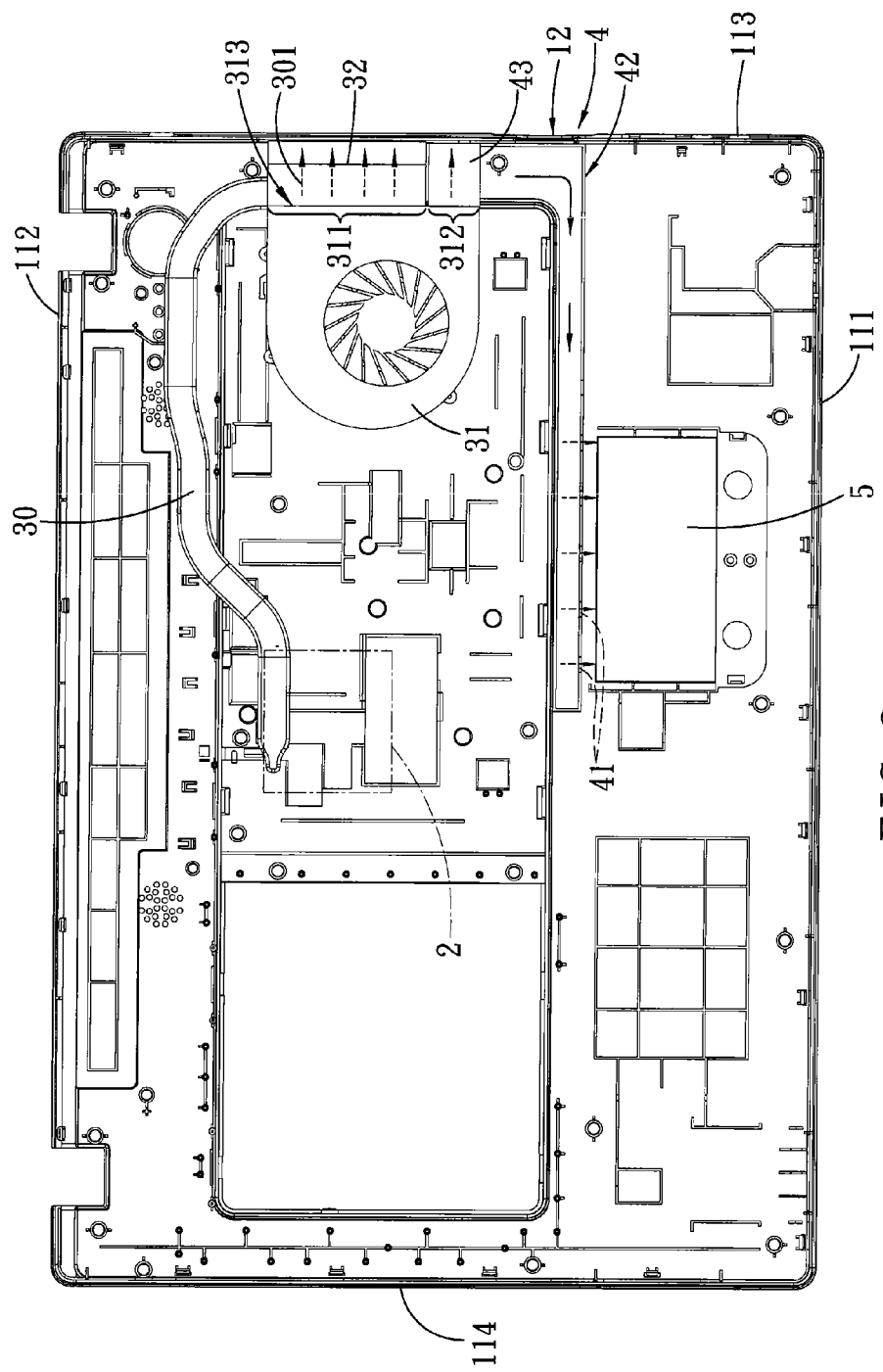
FIG. 2 is a schematic view illustrating a heat-dissipating module disposed on an upper housing member of the first preferred embodiment.

Referring to FIG. 1 and FIG. 2, a first preferred embodiment of an electronic device 101 of the present invention includes a housing unit 1, a first electronic component 2, a heat-dissipating module 3, and an air-guide passage 4. In this embodiment, the electronic device 101 is exemplified as a notebook computer but should not be limited to the disclosure in this embodiment. The present invention may be applied to any electronic device that requires a fan for heat dissipation and that has limited space in its housing.

The first electronic component 2 (such as a CPU, a chip unit or a VGA card), the heat-dissipating module 3 and the air-guide passage 4 are disposed in the housing unit 1. The heat-dissipating module 3 includes a fan unit 31 and a heat-dissipating sink 32. The fan unit 31 has a first air outlet zone 311 and a second air outlet zone 312. The heat-dissipating sink 32 is adapted for dissipating heat generated by the first electronic component 2. The heat-dissipating sink 32 is substantially aligned with the first air outlet zone 311 such that air exiting the fan unit 31 through the first air outlet zone 311 blows toward the heat-dissipating sink 32 and takes away heat of the heat-dissipating sink 32.

The air-guide passage 4 is in spatial communication with the second air outlet zone 312 and is formed with at least one passage air outlet 41. Air through the first air outlet zone 311 flows in a first direction (as illustrated by arrows 301 in FIG. 2). Air through the passage air outlet 41 is directed into the housing unit 1 and flows in a second direction different from the first direction.

By disposition of the fan unit 31, the heat-dissipating sink 32 and the air-guide passage 4 as mentioned above, when the fan unit 31 operates, a portion of air exiting the fan unit 31 flows through the first air outlet zone 311 and the heat-dissipating sink 32 and takes heat of the heat-dissipating sink 32 away. Furthermore, another portion of air exiting the fan unit 31 flows through the second air outlet zone 312, enters the air-guide passage 4, and is directed to flow in the housing unit 1 in the second direction different from the first direction in which air through the first air outlet zone 311 flows. Therefore, an effect of heat dissipation in different areas in the housing unit 1 using a single fan (i.e., the fan unit 31) is achieved. Moreover, since air guided by the air-guide passage 4 may not pass through other electronic components and absorb heat generated thereby, air guided by the air-guide passage 4 may be directed, with a relatively low temperature, to the second direction different from the first direction in which air through the first air outlet zone 311 flows.

Preferably, the housing unit 1 has a first side edge 111. In this embodiment, the first side edge 111 is a front edge when the electronic device 101 is in a state of use. The housing unit 1 further has a rear edge 112 and a pair of lateral edges 113, 114. The electronic device 101 further includes a second electronic component 5 disposed in the housing unit 1 between the first side edge 111 and the passage air outlet 41 of the air-guide passage 4. An embodiment of the second electronic component 5 may be a circuit board that is disposed adjacent to a touch pad and that may absorb heat generated by other electronic components such as a memory unit. In this embodiment, the second electronic component 5 is disposed adjacent to the first side edge 111 of the housing unit 1, and the passage air outlet 41 is oriented toward the second electronic component 5, such that air guided by the air-guide passage 4 may flow to the second electronic component 5 through the passage air outlet 41 thereby absorbing heat generated by the second electronic component 5 in operation. In other words, an area where the second electronic component 5 is disposed is in the second direction in which air through the passage air outlet 41 flows.

Preferably, the fan unit 31 is formed with an air outlet opening 313. In detail, the fan unit 31 includes a fan housing 31a and a blade unit 31b disposed in the fan housing 31a. The air outlet opening 313 is formed in the fan housing 31a. The heat-dissipating sink 32 is disposed adjacent to the air outlet opening 313. The air-guide passage 4 is in spatial communication with the air outlet opening 313. Therefore, the air outlet opening 313 has one portion that is aligned with the heat-dissipating sink 32 and that defines the first air outlet zone 311, and another portion that is in spatial communication with the air-guide passage 4 and that defines the second air outlet zone 312. Moreover, the first air outlet zone 311 is located at said one portion of the air outlet opening 313 through which a greater amount of air exiting the fan unit 31 flows, and the second air outlet zone 312 is located at said another portion of the air outlet opening 313 through which a lesser amount of air exiting the fan unit 31 flows. Alternatively, the same effect may be achieved in a manner that the heat-dissipating sink 32 occupies more area of the air outlet opening 313 than that of the air outlet opening 313 which the air-guide passage 4 occupies, such that a greater amount of air exiting the fan unit 31 flows through the heat-dissipating sink 32.

Preferably, the air-guide passage 4 includes a side wall portion 42 formed on the housing unit 1, and a shell portion 43 connected to the side wall portion 42. The side wall portion 42 defines a passage space 421. The side wall portion 42 is formed with the aforesaid passage air outlet 41. The shell portion 43 is disposed adjacent to the fan housing 31a of the fan unit 31 and has a first shell opening 431 in spatial communication with the second air outlet zone 312, and a second shell opening 432 in spatial communication with the passage space 421. In detail, the housing unit 1 includes an upper housing member 12, a lower housing member 13 connected to the upper housing member 12, and a circuit board 14 disposed between the upper housing member 12 and the lower housing member 13. The side wall portion 42 is formed integrally on and extends downwardly from a bottom surface of the upper housing member 12 toward the lower housing member 13. When the circuit board 14 is connected between the upper housing member 12 and the lower housing member 13, the circuit board 14 covers the side wall portion 42 so as to form an enclosed tubular passage, thereby defining the passage space 421.

The first electronic component 2 is disposed on the circuit board 14. The heat-dissipating module 3 further includes a heat-conducting pipe 30 having one end coupled to the heat-dissipating sink 32. When the circuit board 14 is connected between the upper housing member 12 and the lower housing member 13, the first electronic component 2 is coupled to another end of the heat-conducting pipe 30.

As mentioned above, in the present invention, air exiting the fan unit 31 is divided by disposition of the air-guide passage 4 such that a portion of air exiting the fan unit 31 flows through the heat-dissipating sink 32 for heat dissipation, and another portion of air exiting the fan unit 31 is guided to an area, which is relatively far from the fan unit 31 and where air exiting the fan unit 31 may not reach the area directly such that the area is prone to heat accumulation, for heat dissipation. Subsequently, an issue of heat dissipation in an area prone to heat accumulation is effectively settled.

Figure 3:
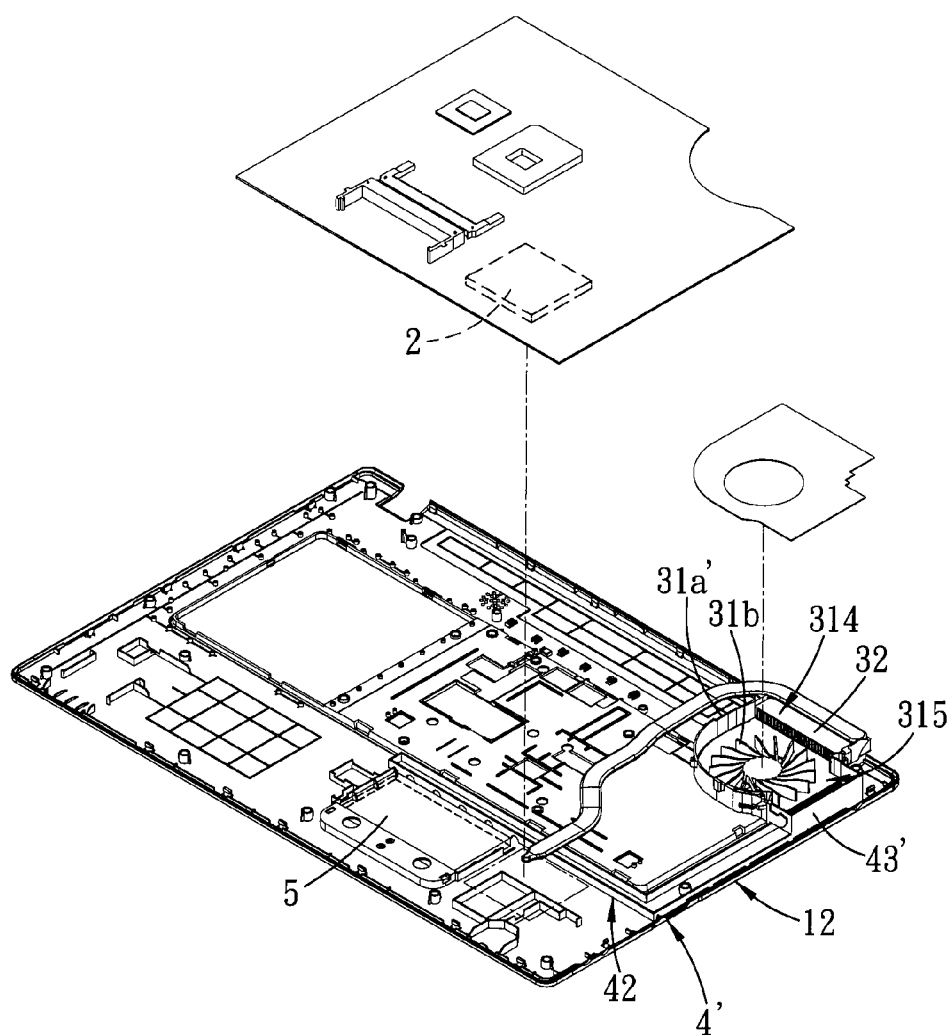
FIG. 3 is an exploded perspective view illustrating a second preferred embodiment of the electronic device of the present invention.
Figure 4:
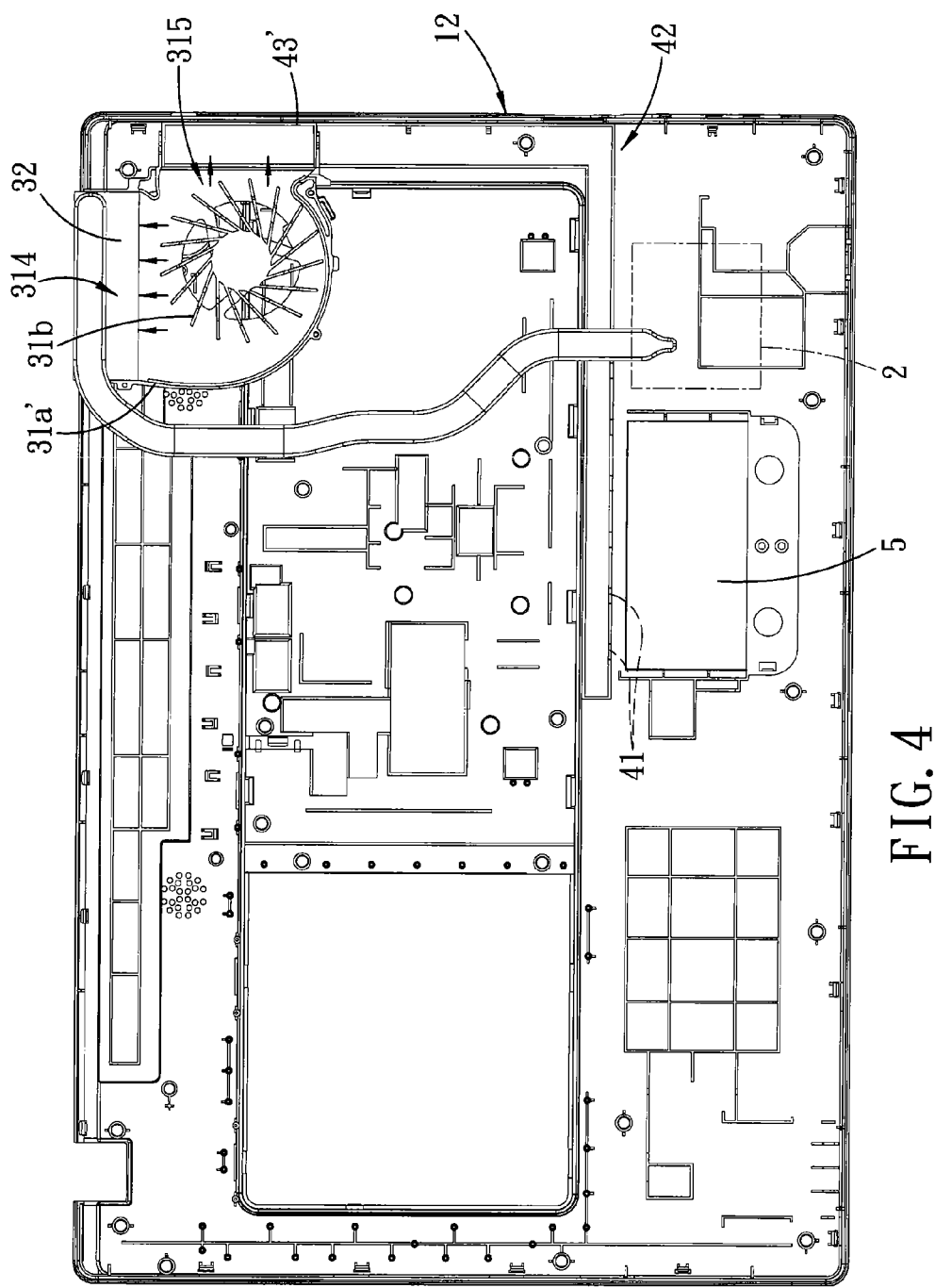
FIG. 4 is a schematic view illustrating a heat-dissipating module disposed on an upper housing member of the second preferred embodiment.

Referring to FIG. 3 and FIG. 4, a second preferred embodiment of the present invention is illustrated. In this embodiment, the fan housing 31a' is formed with a first air outlet opening 314 and a second air outlet opening 315 that are oriented in different directions. The first air outlet opening 314 defines a first air outlet zone, and the second air outlet opening 315 defines a second air outlet zone. The heat-dissipating sink 32 is substantially aligned with the first air outlet opening 314. The shell portion 43' of the air-guide passage 4' is disposed adjacent to the second air outlet opening 315 of the fan housing 31a'. Similarly, the first air outlet opening 314 is formed in one portion of the fan housing 31a' through which a greater amount of air exiting the fan unit 31 flows, and the second air outlet opening 315 is formed in another portion of the fan housing 31a' through which a lesser amount of air exiting the fan unit 31 flows compared with air through the first air outlet opening 314. Alternatively, the same effect may be achieved by configuring the first air outlet opening 314 to have a size greater than that of the second air outlet opening 315.

Additionally, in the aforementioned two preferred embodiments, the side wall portion 42 is formed on the upper housing member 12. However, as long as dispositions of other electronic components are not influenced, the side wall portion 42 and the shell portion 43, 43' may be formed on the lower housing member 13, or on each of the upper housing member 12 and the lower housing member 13 so as to define the air-guide passage 4, 4' when the upper housing member 12 and the lower housing member 13 are interconnected.

Figure 5:
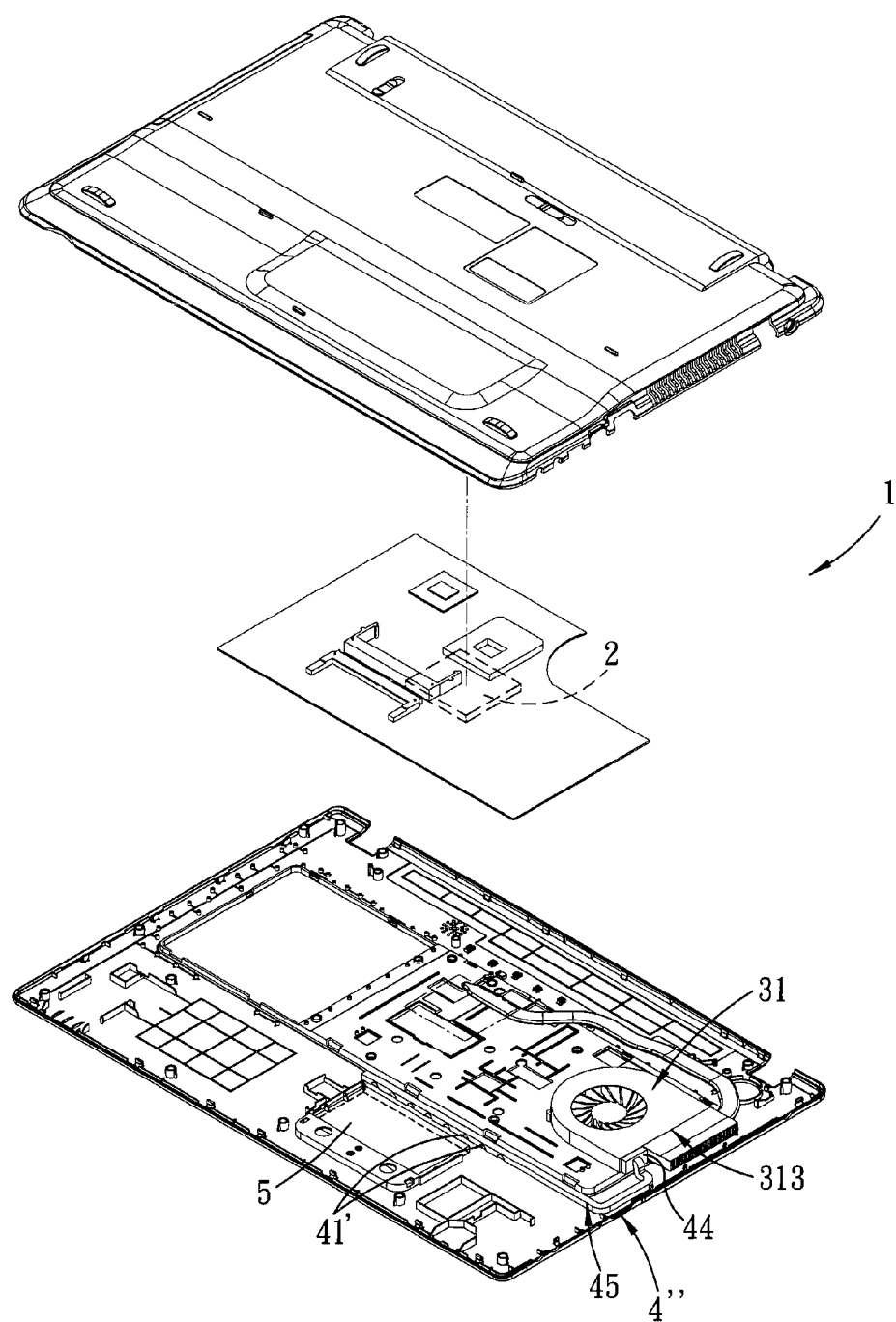
FIG. 5 is an exploded perspective view illustrating a third preferred embodiment of the electronic device of the present invention.
Figure 6:
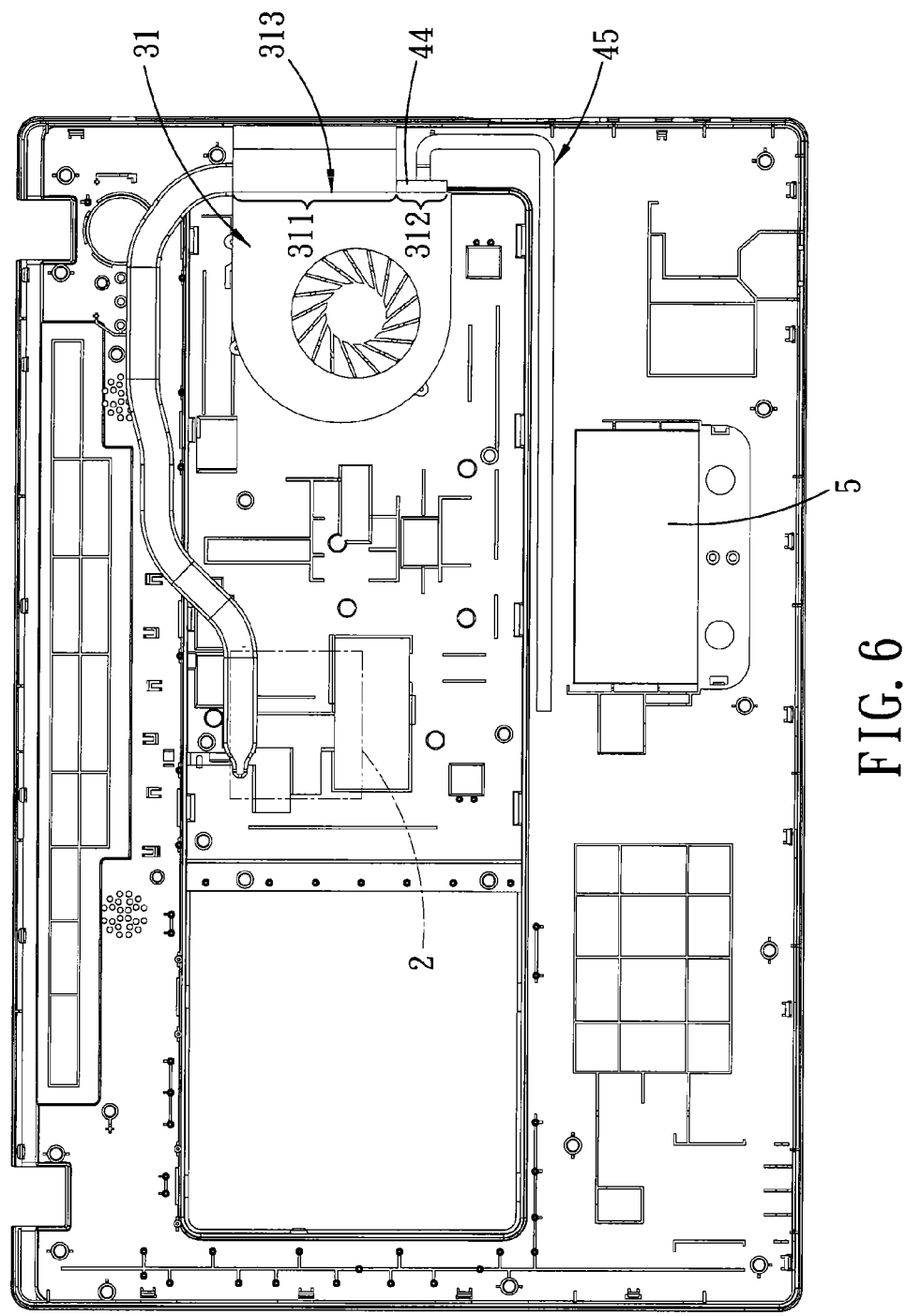
FIG. 6 is a schematic view illustrating a heat-dissipating module disposed on an upper housing member of a third preferred embodiment.

Referring to FIG. 5 and FIG. 6, a third preferred embodiment of the present invention is illustrated. The third preferred embodiment differs from the first preferred embodiment in that a pipe member 45 is provided for replacing the side wall portion 42 which defines the passage space 421 (as illustrated in FIG. 1 and FIG. 2). The pipe member 45 has one end coupled to the second air outlet zone 312. A segment of the pipe member 45 which is adjacent to another end of the pipe member 45 is formed with a plurality of passage air outlets 41' oriented toward the second electronic component 5.

In this way, the air-guide passage 4'' may be disposed in the housing unit 1 with relative ease by replacing the side wall portion 42 with the pipe member 45.

Preferably, in the third preferred embodiment, a seal block 44 is provided for replacing the shell portion 43 in the first preferred embodiment. The seal block 44 may be made of rubber materials. The seal block 44 is disposed in the air outlet opening 313 and seals the second air outlet zone 312. The one end of the pipe member 45 which is coupled to the second air outlet zone 312 passes through the seal block 44 for spatial communication with the second air outlet zone 312 of the air outlet opening 313.

Additionally, in the aforesaid three preferred embodiments, the passage air outlet 41, 41' is formed in the side wall portion 42 or the pipe member 45. However, in other embodiments, the passage air outlet 41, 41' may be formed in another end of the side wall portion 42 or the pipe member 45 distal from the second air outlet zone 312, i.e., the side wall portion 42 or the pipe member 45 has one end in spatial communication with the second air outlet zone 312 and another end oriented directly toward the aforementioned second direction or the second electronic component 5.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic device comprising:
   a housing unit;
   a first electronic component disposed in said housing unit;
   a heat-dissipating module including:
      a fan unit disposed in said housing unit and having a first air outlet zone and a second air outlet zone; and
      a heat-dissipating sink disposed in said housing unit for dissipating heat generated by said first electronic component, said heat-dissipating sink being substantially aligned with said first air outlet zone; and
      an air-guide passage disposed in said housing unit, said air-guide passage being in spatial communication with said second air outlet zone and being formed with a passage air outlet, air through said first air outlet zone flowing in a first direction, air through said passage air outlet being directed into said housing unit and flowing in a second direction different from the first direction;
   wherein said air-guide passage includes a side wall portion formed on said housing unit and a shell portion connected to said side wall portion, said side wall portion defining a passage space and being formed with said passage air outlet, said shell portion being disposed adjacent to said fan unit and having a first shell opening in spatial communication with said second air outlet zone, and a second shell opening in spatial communication with said passage space.

2. The electronic device as claimed in claim 1, wherein said fan unit is formed with an air outlet opening, said air outlet opening having one portion that defines said first air outlet zone, and another portion that defines said second air outlet zone.

3. The electronic device as claimed in claim 1, wherein said housing unit includes an upper housing member and a lower housing member connected to said upper housing member, each of said side wall portion and said shell portion being formed on one of said upper housing member and said lower housing member.

4. The electronic device as claimed in claim 1, wherein said fan unit is formed with a first air outlet opening and a second air outlet opening that are oriented in different directions, said first air outlet opening defining said first air outlet zone, said second air outlet opening defining said second air outlet zone.

5. The electronic device as claimed in claim 4, wherein said housing unit includes an upper housing member and a lower housing member connected to said upper housing member, each of said side wall portion and said shell portion being formed on one of said upper housing member and said lower housing member.

6. The electronic device as claimed in claim 2, wherein said air-guide passage includes a pipe member formed with said passage air outlet.

7. The electronic device as claimed in claim 6, wherein said heat-dissipating module further includes a seal block that is disposed in said air outlet opening and that seals said second air outlet zone, said pipe member having one end passing through said seal block for spatial communication with said second air outlet zone of said air outlet opening.

8. The electronic device as claimed in claim 1, wherein said heat-dissipating module further includes a heat-conducting pipe coupled between said heat-dissipating sink and said first electronic component.

9. The electronic device as claimed in claim 1, wherein said housing unit has a first side edge, said electronic device further comprising a second electronic component disposed in said housing unit between said first side edge and said passage air outlet of said air-guide passage, said passage air outlet being oriented toward said second electronic component.

* * * * *